June 21, 1927.  W. H. HUTH  1,633,019
ELECTRICAL CONDENSER
Filed Nov. 19, 1925
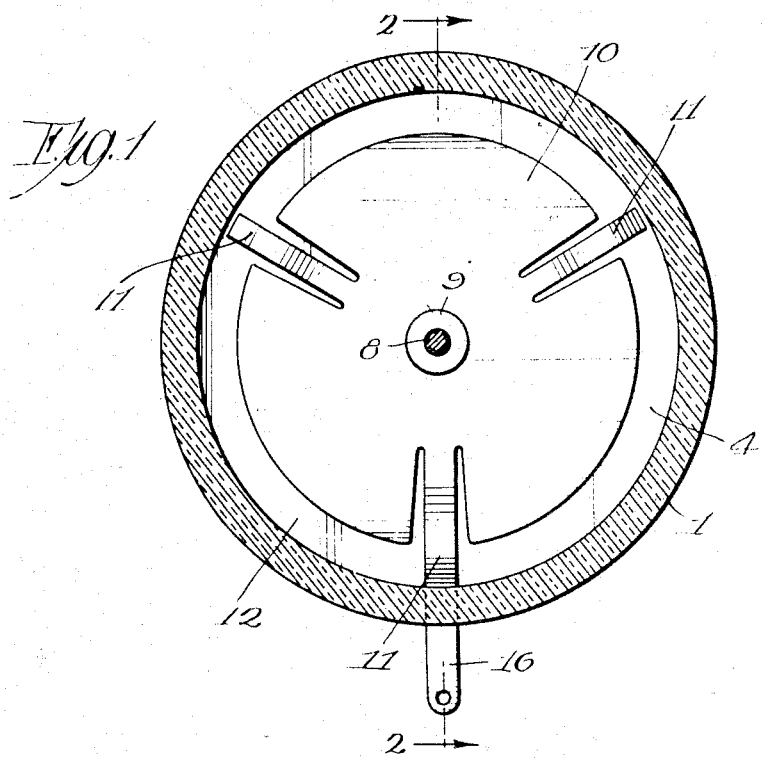
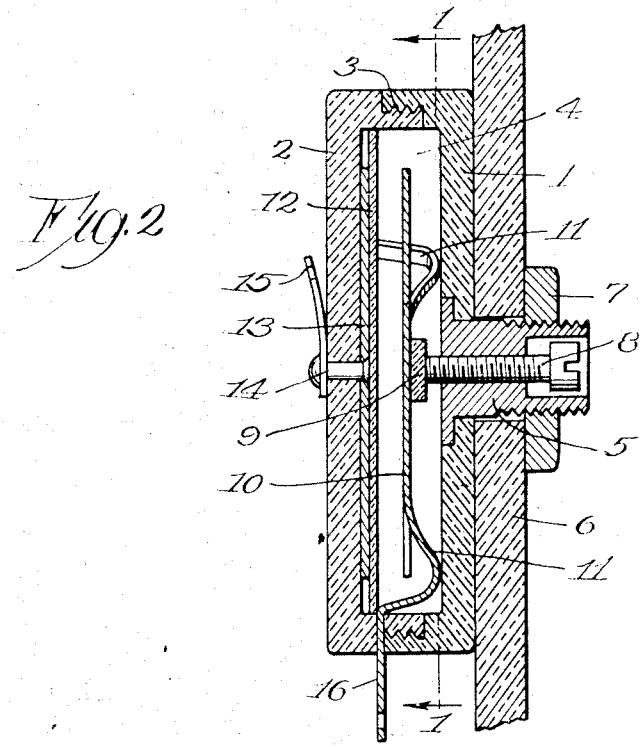
Inventor:
Walter H. Huth
By Arthur F. Durand
Atty.

Patented June 21, 1927.

1,633,019

UNITED STATES PATENT OFFICE.

WALTER H. HUTH, OF CHICAGO, ILLINOIS.

ELECTRICAL CONDENSER.

Application filed November 19, 1925. Serial No. 70,053.

This invention relates to electrical condensers, and more particularly to those which are adjustable, to regulate the capacity thereof, and more especially to those which are adapted to be used for tuning purposes in radio receiving apparatus.

Generally stated, therefore, the object of the invention is to provide a novel and simple and improved construction of condenser, which can be manufactured and sold at a comparatively small cost of production, and which can be adjusted, preferably before leaving the factory, to insure the exact capacity desired, and which can then be incorporated in radio or other apparatus, either by the manufacturer of such apparatus or by the user thereof, for any suitable or desired purpose.

It is also an object to provide certain details and features of construction in combinations tending to increase the general efficiency and the desirability of an electrical condenser of this particular character.

To the foregoing and other useful ends, the invention consists in matters hereinafter set forth and claimed and shown in the accompanying drawings in which:

Fig. 1 is a transverse section on line 1—1 in Fig. 2, showing a condenser embodying the principles of the invention.

Fig. 2 is a longitudinal or axial section on line 2—2 in Fig. 1.

As thus illustrated, the invention comprises a two-part casing of fibre or other suitable insulating material, comprising the section 1 and the section 2, which are flat and have annular edges, and which are screwed together by means of screw threads 3 formed on their engaging portions, thus providing a flat round box having a chamber 4 therein.

A bushing 5, of fibre or metal or other material, is preferably inserted through the section 1, in the manner shown, to extend through the wall or other support 6, the end of this bushing being threaded to receive a nut 7 by which the condenser as a whole is detachably clamped upon the said wall. A screw 8 is inserted through the bushing 5, in the manner shown, and is adapted to bear against the insulation 9 on the metal plate 10, which latter has the radially arranged bent portions 11 and 11 which bear against the inner surface of the section 1, at their elbows, and which at their extreme ends bear against the mica or other plate 12 which forms the dielectric of the condenser. The other metal plate 13 of the condenser is disposed underneath the mica plate 12 and held in place by a metal stud 14 which has a terminal 15 as shown. The portion 11 has an extension 16 to serve as the other terminal of the condenser, and by attaching circuit wires to the terminals 15 and 16 the condenser can be incorporated in any desired circuit. The plate 10 is of more or less springy or resilient metal, and can be moved toward and away from the plate 13 by the adjustment of the screw 8, the portions 11 and 11 bending one way or the other for this purpose. In this way the capacity of the condenser can be adjusted or changed or regulated, to suit the requirements, preferably before the condenser leaves the factory. Of course, the user can, by applying a screw driver to the head of the screw 8, adjust or regulate the condenser, but the intent and purpose is more especially with reference to the desirability of providing a condenser which can be carefully adjusted or regulated before it leaves the factory, and which will not then need or require any further adjustment or regulation by the user, whereby a comparatively cheap and yet efficient condenser is provided, for any desired purpose, as distinct from condensers which are designed and intended to be adjusted by the user for ordinary tuning or other purposes.

The condenser shown and described is susceptible of manufacture at a comparatively low cost of production, is easily assembled in the manner shown, and is of a compact and unitary form, being adapted to be easily and conveniently incorporated in any radio receiving apparatus, or in any apparatus where it is necessary and desirable to interpose the condenser, for any desired purpose, at some point in an electrical circuit.

Furthermore, it will be seen that the construction shown and described has the advantage of being adjustable, to regulate the capacity, without distortion of the plate 10, and without distortion of the flat and disclike body portion thereof, whereby the distance between the two flat plates of the condenser may be varied or changed in a desirable and effective manner, without distortion of anything more than the legs or arms 11 and 11, and such distortion is not calculated to interfere in any way with the action and efficiency of the condenser.

Moreover, with the construction shown and described, it will be seen that the condenser is of such character that the application of a screw driver to the head of the screw 8, and the proximity of the hand of the person doing the work, will only have a minimum effect on the condenser, and will not interfere, at least not seriously, with the accurate adjustment of the condenser in the manner desired. In some condensers, as is well known, the construction is such that the application of a screw driver or other tool, for the adjustment of the condenser, and even the proximity of the person doing the work, are sufficient to interfere with the proper adjustment of the condenser, to an extent that the adjustment obtained is not permanent, but changes when the person doing the work has moved away a distance. But in the construction shown and described the object is to avoid this difficulty in so far as possible, or to minimize the difficulty, and to thus provide a condenser in which the capacity will be substantially the same after the adjustment is completed and after the person doing the work has departed; and, with the construction shown and described, the condenser plates and dielectric are practically sealed in a dust-tight and waterproof casing, and in the construction shown the chamber 4 can be made proof against the entrance of dust or dampness, and may even be made practically air-tight, without interfering in any way with the facility with which the condenser may be adjusted after it is assembled and completed.

With the construction shown and described as illustrative of the invention, the outer edges of the plate 10 are free, and distortion of this plate is not necessary for adjustment to regulate the capacity of the condenser, as the only distortion necessary is that of the arms 11 in the manner explained. As the terminal 16 is an extension of one of said arms, and is extended through the section 2 of the casing, it follows that the two condenser plates and the dielectric form a structural unit with the section 2 of the casing, and can be removed as a unit, when desired. On the other hand, the adjusting means and the section 1 of the casing form a separate structural unit. The plate 10 is in no way dependent upon the adjusting means for anything but the adjustment of the condenser to regulate the capacity thereof, the positioning means 11 being sufficient to position the plate 10 in the condenser, and being entirely independent of the adjusting means. Also, of course, the plates and dielectric are held against rotation in the condenser, and these elements do not rotate when the screw is rotated to adjust the condenser.

Without disclaiming anything, and without prejudice to any novelty disclosed, what I claim as my invention is:

1. In an electrical condenser, the combination of a housing therefor comprising two casing sections secured together to provide a chamber between them, condenser plates and dielectric means in said chamber, held against rotation, with one plate movable and free at its outer edges, instrumentalities to movably position said one plate in said chamber, so that the one plate is movable while remaining flat, and mechanism for regulating the capacity of the condenser, disposed entirely at one side of the movable plate, extending axially through one section of the casing, operative by pressure on the movable plate to vary the distance between the plates.

2. A structure as specified in claim 1, said one plate having springy arm portions forming said instrumentalities for positioning the plate in the condenser, and said adjusting mechanism being operative to exert pressure on the center of the plate and to flex said springy portions to permit movement of the plate axially of the condenser, whereby distortion of the main body of the plate is not necessary for said adjustment.

3. A structure as specified in claim 1, the one plate having radial springy positioning portions forming said instrumentalities, with insulation between this plate and said adjusting mechanism, another plate being stationary and fastened to one section of the casing, and the dielectric between the two plates being held in place by said springy portions.

4. A structure as specified in claim 1, said mechanism comprising an axially arranged rotary adjusting screw, and means whereby rotation of said screw will cause endwise movement thereof, said one condenser plate having insulating engagement with the inner end of said screw, and the outer end of said screw having a head for the adjustment thereof by a screw driver or other means.

5. An electrical condenser comprising metal plates and dielectric held against rotation, at least one of said plates having springy positioning portions for positioning the plate with its outer edges free, and adjusting mechanism disposed entirely at one side of the one plate and comprising an axially movable rotary screw for causing the flexing of said springy portions, thereby to permit movement of the plate axially of the condenser, to regulate the capacity of the condenser.

6. A structure as specified in claim 5, comprising a dielectric plate held in place by said springy portions, the plate being cut back a distance from its outer edges to form said springy portion.

7. A structure as specified in claim 5, comprising a casing of insulation for the condenser, and an axial bushing for said casing, in which bushing said screw is threaded having provisions for the insertion of said bushing through a wall or support, and for thus clamping the condenser in position on said wall or support.

8. A structure as specified in claim 5, comprising a casing of insulation for the condenser, and an axial bushing for said casing, having provisions for the insertion of said bushing through a wall or support, and for thus clamping the condenser in position on said wall or support, together with an adjusting screw extending axially through said bushing, forming said adjusting mechanism, the plate having said springy portions having insulating engagement with the inner end of said screw.

9. A condenser comprising a casing comprising separately connected sections, forming a chamber between them, a metal condenser plate secured flatwise in one section, the two sections being of insulating material, a terminal for said plate on the outer surface of the section to which it is secured, a dielectric in position flatwise against said plate, a movable metal plate cut back a distance from its outer edges, to form springy arms to movably position this plate in said chamber, with said dielectric between the two plates, whereby the outer edges of the movable plate are free, and rotary adjusting means carried by the other section and operable by axial movement thereof when rotated for exerting pressure upon the central portion of said movable plate, thereby to flex said arms and cause relative movement of the two plates toward and away from each other, said movable plate being entirely insulated within said chamber.

10. A structure as specified in claim 9, one of said arms being extended outwardly through the section to which the stationary plate is attached, so that this particular arm holds the movable plate and the dielectric together in the casing section, said adjusting means being separable from said movable plate, whereby both plates and the dielectric form a structural unit with the one section of the casing, while said adjusting means and the other section of the casing form a separate structural unit, the springy arm which is extended through the casing being adapted for use as the terminal of said movable plate.

Specification signed this 17th day of November, 1925.

WALTER H. HUTH.